United States Patent [19]

Benson, Jr.

[11] Patent Number: 5,544,446
[45] Date of Patent: Aug. 13, 1996

[54] COLLAPSIBLE AND ADJUSTABLE PLANT SUPPORT AND PROTECTOR

[76] Inventor: Donald O. Benson, Jr., 10 Livery Rd., Chelmsford, Mass. 01824

[21] Appl. No.: 441,040

[22] Filed: May 15, 1995

[51] Int. Cl.$^6$ .......................... A01G 17/06; A01G 17/14
[52] U.S. Cl. ........................................ 47/45; 220/6
[58] Field of Search .................. 47/45 R, 45 C, 47/44 R; 220/6, 7, 489

[56] References Cited

U.S. PATENT DOCUMENTS

| | | |
|---|---|---|
| 1,635,071 | 7/1927 | Comstock ............................. 47/45 C |
| 2,651,502 | 9/1953 | Carvelo et al. ....................... 47/45 C |
| 3,793,771 | 2/1974 | Slaughter . |
| 4,005,548 | 2/1977 | Nahon . |
| 4,026,068 | 5/1977 | Tepper . |
| 4,073,091 | 2/1978 | Vogel . |
| 4,211,033 | 7/1980 | Ringer ................................... 47/45 C |
| 4,503,636 | 3/1985 | Stuckey . |
| 4,667,438 | 5/1987 | Corell . |
| 4,894,951 | 1/1990 | Risley .................................... 47/45 C |
| 4,914,857 | 4/1990 | Dodgen . |
| 5,179,799 | 1/1993 | Hillestad . |
| 5,323,559 | 6/1994 | Allman ........................................ 47/45 |

FOREIGN PATENT DOCUMENTS

| | | | |
|---|---|---|---|
| 0154049 | 9/1985 | European Pat. Off. ............... 47/45 C |
| 1003097 | 12/1946 | France ......................................... 220/6 |
| 2268463 | 1/1994 | United Kingdom ......................... 220/6 |

*Primary Examiner*—Terry Lee Melius
*Assistant Examiner*—Joanne C. Downs

[57] ABSTRACT

A plant support is constructed comprising a plurality of rectangular sections where the adjoining edge of each section is connected by a hinge mechanism. The hinges allow movement of each section so the plant support can be used in a straight open configuration or used to enclose any desired area from nearly circular to rectangular. Each section is constructed to form lattices with the voids in the lattices large enough for harvesting and weeding the enclosed plant but small enough to protect the plant from animals. The plant support is held upright by vertical support rods that are not permanently attached to the plant support. The independent vertical support rods thus can be placed at any desirable location and can be driven into the ground to any desirable depth. The height of the plant support can be increased by attaching, to the vertical support rods, another plant support above the bottom of the lower plant support.

6 Claims, 4 Drawing Sheets

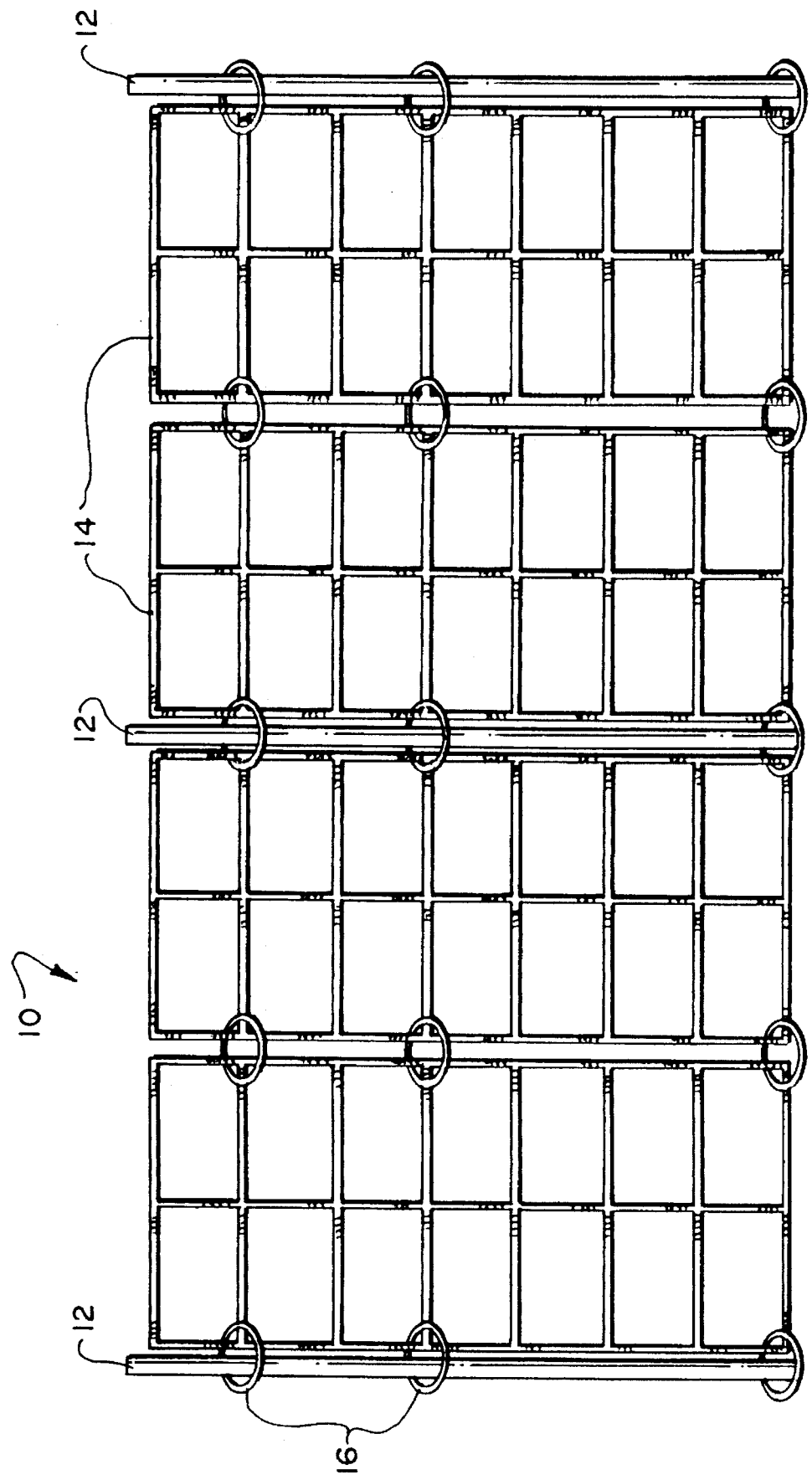

COLLAPSIBLE AND ADJUSTABLE PLANT SUPPORT AND PROTECTOR

BACKGROUND OF THE INVENTION

Many plant support structures in prior art are constructed with vertical support poles or rods (usually to be driven into the ground) that are permanently attached to the other parts of the plant support. Examples of these are: U.S. Pat. Nos. 4,005,548 to Nahon (1977) and 4,026,068 to Tepper (1977). In other types of prior art plant supports, the vertical support poles can be separated from the rest of the plant support but there are permanent places on the vertical support pole for attachment of other parts of the plant support. When assembled the relation between the vertical support poles and the rest of the plant structure is fixed. Examples of these plant supports are: U.S. Pat. Nos. 4,667,438 to Corell (1987) and 5,179,799 to Hillestad (1993). Finally some plant support structures allow for adjustment of only some of the support structure as shown in U.S. Pat. No. 4,914,857 to Dodgen (1990). In all cases the vertical support poles are all driven into the ground the same distance. Thus some vertical support poles cannot be driven into the ground further than others to provide additional support. Additional support may be necessary when some of the vertical support poles hit rocks, roots, hard ground or the like. Additionally if the ground slopes, the vertical support poles on the upper side should be driven in the ground further for added support to keep the plant and its support cage from tipping over when the plant such as a tomato becomes large.

Prior art plant supports also have fixed support areas. In U.S. Pat. No. 5,179,799 to Hillestad (1993) each ting has a fixed area forming a fixed cage, and cannot be changed either at the start of the growing season for different varieties of plants or during the growing season to accommodate unusual plant growth. Thus the plant supports cannot adjust for different types of growth habitats expected from, for example, different varieties of tomato plants, nor can the plant supports be adjusted to a larger or smaller area during the growing season.

Most of the plant supports in prior art offer only support and are not designed to also provide protection from animals such as woodchucks or squirrels that can attack the plants as well as the fruit of the plants. Designs offering protection from animals would specify the spacing of the support structure.

Many of the prior art plant supports are not collapsible. Those that are, collapse in only one way and, while reducing the volume, still result in a storage area that is large. For example in U.S. Pat. No. 4,503,636 to Stuckey (1985) the tings that are detachable from the vertical support structure still have the large area of the detached rings. In U.S. Pat. Nos. 3,793,771 to Slaughter (1974) and 4,073,091 to Vogel (1978) the collapsible rectangular cage folds resulting in an area equal to one side of the cage. Even though these designs reduce the volume, the resulting large area is still cumbersome for storage, shipping and cleaning.

U.S. Pat. No. 2,651,502 to Carvelo et al. (1953) specifies a sectional low wire fence in which each section must be assembled to the previous section with a vertical support pole. The poles can be driven into the ground only to a fixed depth with respect to the fence, and the poles can only be placed at the pivot location. Furthermore the fence cannot be extended in height. U.S. Pat. No. 4,211,033 to Ringer (1980) shows a compost enclose where plants are placed around the outside, and there are no vertical support rods, and thus this invention offers no protection of plants from predators. The perimeter of this invention is fixed and also cannot be extened in height.

OBJECTIVE OF THE INVENTION

The objectives of the invention are to provide a plant support:

1. that is collapsible into a small space by a choice of methods such as folding or rolling for the same plant support;
2. that is adjustable in area, height and geometry such as a nearly circular cage style, or a narrow rectangular enclosure;
3. that has independent vertical structures each of which can be placed at any desirable location and can be driven into the ground to any desirable depth;
4. that offers protection from animals as well as plant support.

Further objectives of the invention are to provide an open configuration for climbing plants such as peas or cucumbers. The open configuration does not offer protection, but if desired, using the easily adjustable features of the invention, the geometry can be changed into a narrow rectangle enclosing the plants for protection using one or more of the plant protectors.

The intent of the invention also is to provide the above features and yet be simple enough in design to be inexpensive to manufacture and inexpensive for a consumer to buy.

BRIEF DESCRIPTION OF THE DRAWINGS

FIG. 4 shows the plant support/protector used in a straight open configuration.

REFERENCE NUMERALS IN DRAWINGS

10—plant support/protector unit
12—vertical support pole or stake
14—sections of plant support/protector
16—ring hinge
18—fastening device such as string, wire or plastic cable ties

DESCRIPTION OF THE PREFERRED EMBODIMENT

Figure 1:
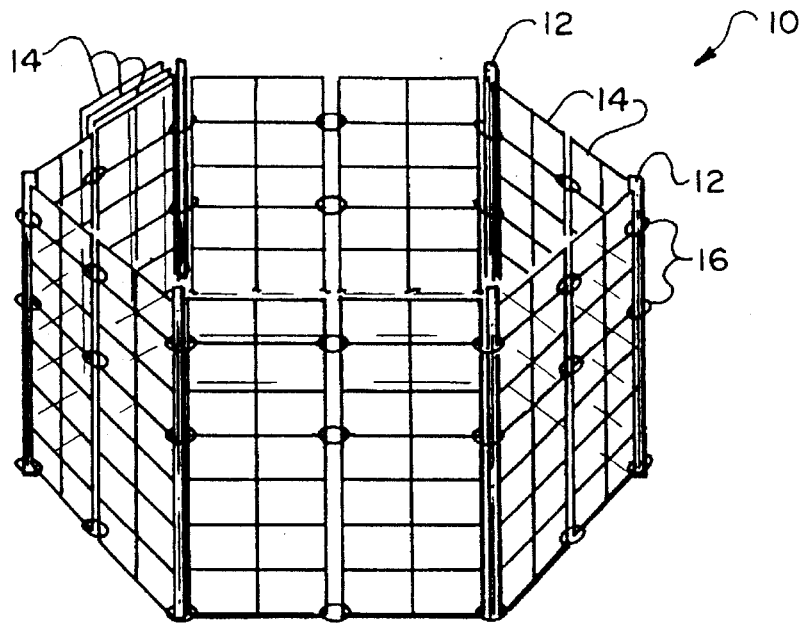
FIG. 1 shows the plant support/protector in a cage configuration with the unused portion folded at the upper left of the figure.

The plant support/protector 10 in FIG. 1 is made from a plurality of rigid sections 14. Each section is connected to the other by a plurality of hinges 16 along the vertical edge of each section. The hinges shown in the figures are tings but could be any mechanism that allows each section freedom to move with respect to the other. Because of this freedom of movement, the plant support/protector then can be adjusted to any desired geometry. Vertical support poles 12 are staked into the ground to keep the plant support/protector from tipping over or collapsing.

In FIG. 1, the plant support/protector is placed in a nearly circular cage configuration enclosing a desired area around the plant. The sections of the plant support/protector not needed to enclose the desired area can be folded accordion style as shown in FIG. 1, or continued to be wrapped around. Later in the growing season if it is desired to make the enclosure larger or smaller this can be done by using some of the unused sections for a larger area or folding them up for a smaller area. The vertical support poles 12 must also be repositioned in the ground to change the enclosed area. The vertical support poles do not have to be positioned at the hinge mechanism. The vertical support poles could be staked into the ground at the desired locations, and then the plant support/protector wrapped around the outside perimeter formed by the vertical support poles. Only the starting edge of the plant support/protector would have to be fastened to a vertical support using the tings shown in FIG. 2. This fiction also could be performed by other fastening devices such as tying the sections or hinges to the vertical support poles with, for example, string, wire or plastic cable ties 18. The other vertical support poles, if desired, do not have to be fastened to the sections or hinges. The section meeting the edge of the starting section could be fastened or supported at or near the starting edge by tying it with, for example, string, wire, plastic cable ties or by using another vertical support pole.

Figure 2:
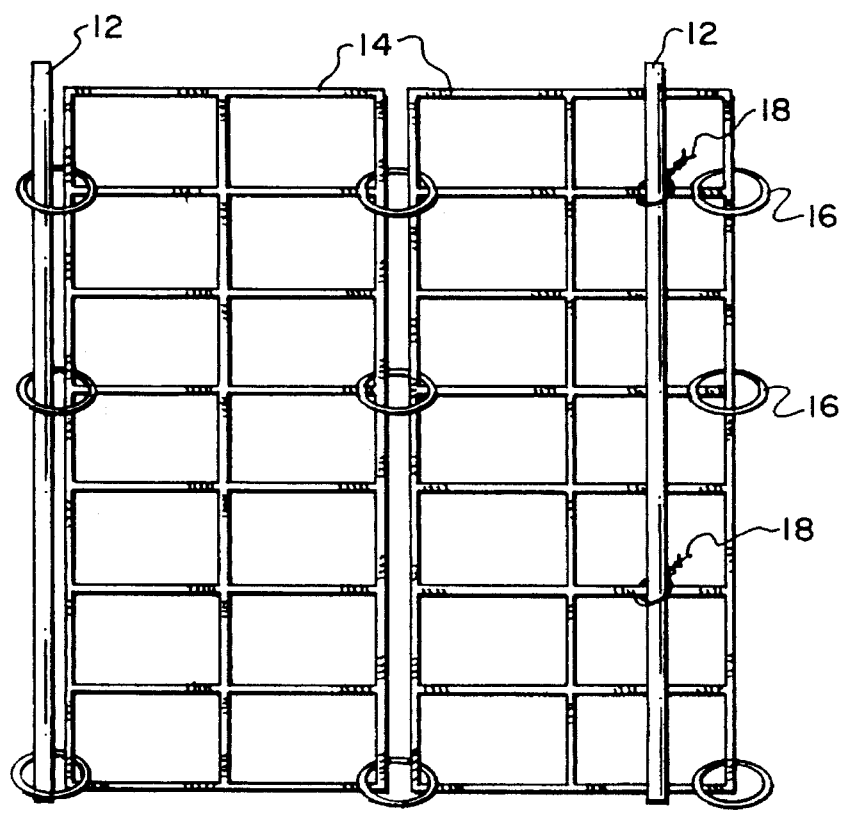
FIG. 2 shows a view of two support/protector sections 14, one an end section connected to the other section by ring hinges 16 that can serve as a guide for the vertical support 12.

A view of two sections is shown in FIG. 2. The end section has tings 16 attached to it to provide a method to attach the plant support/protector to the first vertical support pole. Rings are not necessary but provide a convenience. The first section could be fastened to the vertical support pole by tying it with for example, string, wire or plastic cable ties. The open regions in each section are small enough to prevent animals such as woodchucks from attacking the plants or its produce, but the openings are large enough for a hand to fit through to harvest the produce. If protection is desired for even smaller animals, then another unit could be wrapped around the first unit with the crossings in the sections at the center of the empty spaces of the sections of the first unit. The outer unit could be moved if necessary to harvest the produce.

Figure 3:
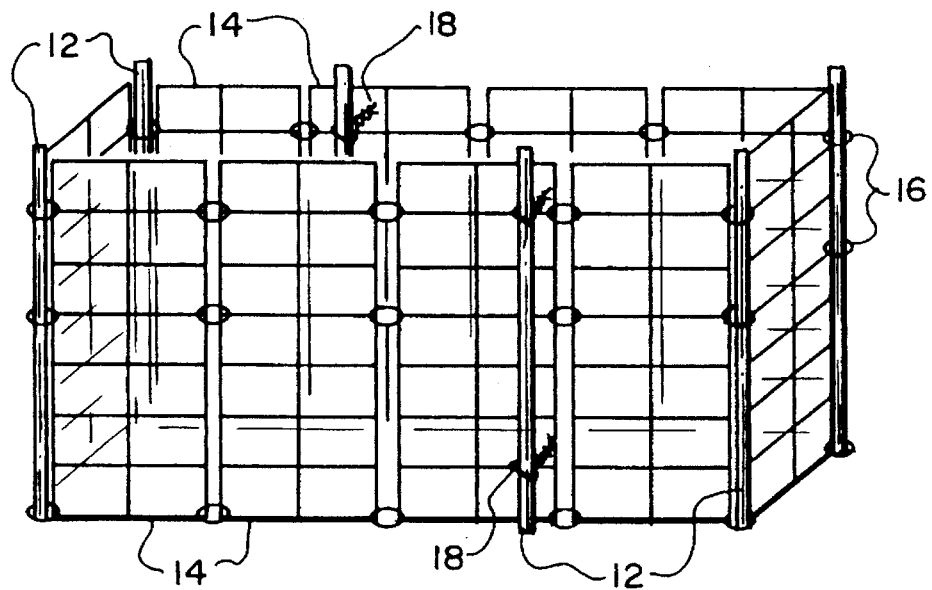
FIG. 3 shows the plant support/protector used in a narrow rectangular configuration with some vertical support poles on the inside of the cage fastened with string, wire or plastic cable ties 18.

In FIG. 3, the plant support/protector is configured in a narrow rectangle with the plants inside the enclosure for protection from animals. One or more units can be used depending upon the size of the rectangular area desired to be enclosed. This configuration is especially well suited for peas or cucumbers. Shown in this figure are some vertical support poles on the inside of the plant support tied to the rigid sections with a fastening device 18 such as string, wire or plastic cable ties.

In FIG. 4, the plant support/protector is in an open configuration. This configuration provides support but not protection and is also well suited for peas or cucumbers.

Figure 5:
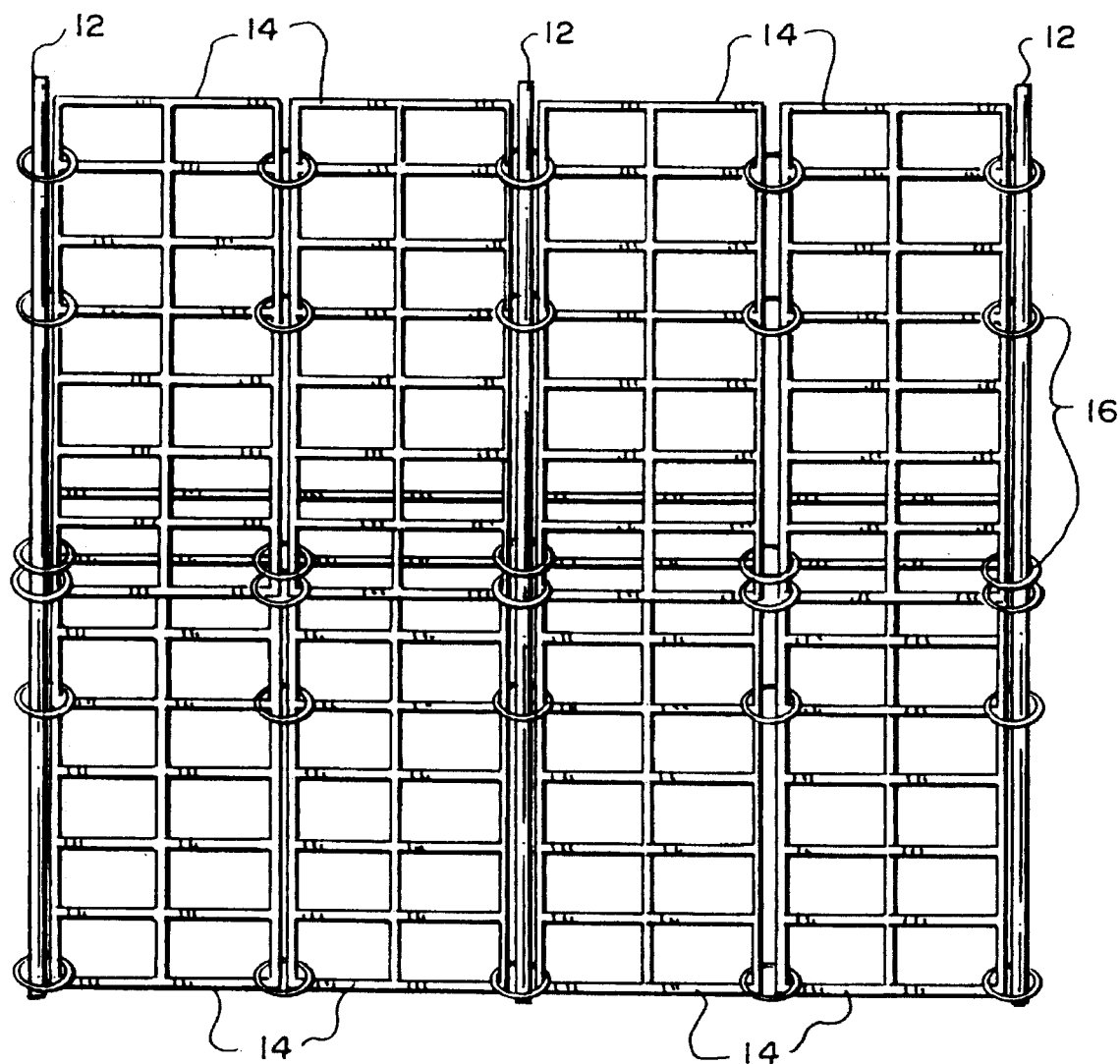
FIG. 5 shows extension of the plant support area with two plant support/protector units stacked two high in a straight open configuration.

Further versatility of the plant support/protector is shown in FIG. 5 where the plant support area is extended by stacking units on top of other units. Additional stacked units can be placed next to each other to also extend the length of the support. Extending the height and length can be done in this manner for other configurations such as a cage or narrow rectangle as well. When the height is extended, longer vertical support poles are required, and the upper units are held in place by vertical support poles inside the ring hinges, and/or tying the upper units to the support poles with fasteners such as string, wire, or plastic cable ties.

Figure 6:
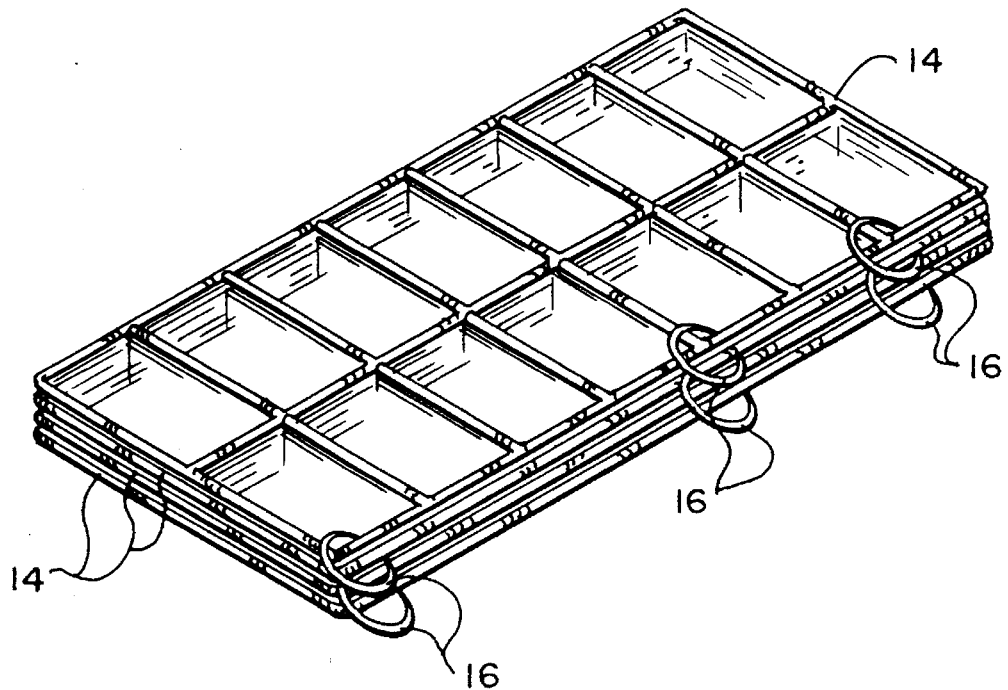
FIG. 6 shows the plant support/protector folded in space saving configuration for storage and shipping.

For storage and shipping, the hinge feature allows the plant support/protector unit to be folded in a small volume and small area as shown in FIG. 6. This figure shows the unit folded at the hinge location for each section. The unit could be folded in other ways, for example, every other hinge location would be folded, then every two sections would be flat on top of each other. The unit also could be rolled for storage or shipping.

Although specific terms are used in the above description for the sake of clarity, these terms are intended to refer only to the particular structure of my invention selected for illustration in the drawings, and are not intended to define or limit the scope of the invention. Thus the scope of the invention should be determined by the following claims and their legal equivalents, rather than by the examples given.

I claim:

1. A plant support comprising:
   (a) three or more connected sections, each said connected section including vertical edges,
   (b) connecting means for adjacent said vertical edges of said connected sections to allow freedom of motion between two adjacent sections,
   (c) vertical support structures unattached to said sections and unattached to said connecting means whereby each vertical support structure can be placed at any desirable location and can be driven into the ground to an independent depth,
   (d) means to hold said connected sections to said vertical support structures, and
   (e) means to extend the height of the plant support by placing additional connected sections above the bottom of corresponding connected sections, said means to extend including at least one said vertical support structure extending through the connecting means of the additional connected sections and through the connecting means of the corresponding connected sections.

2. The plant support of claim 1 wherein voids in said connected sections are of predetermined size whereby produce can be harvested and the enclosed plants and their produce are protected from certain predators.

3. The plant support of claim 1 wherein said connected sections are rectangular shaped and each said connected section is constructed in the form of a lattice with voids in said lattice of predetermined size.

4. The plant support of claim 1 wherein said connecting means are a plurality of rings along each said vertical edge whereby said plant support can be adjusted to form a cage to enclose a desired area or adjusted to be open, and whereby each said connected section can be folded on top of each other for storage and shipping.

5. The plant support of claim 1 wherein an inside diameter of said rings is sufficient to contain said vertical support structures.

6. The plant support of claim 1 wherein said vertical support structures are rods.

* * * * *